No. 865,348.
PATENTED SEPT. 10, 1907.
J. M. ALLISON.
SAW.
APPLICATION FILED FEB. 18, 1907.
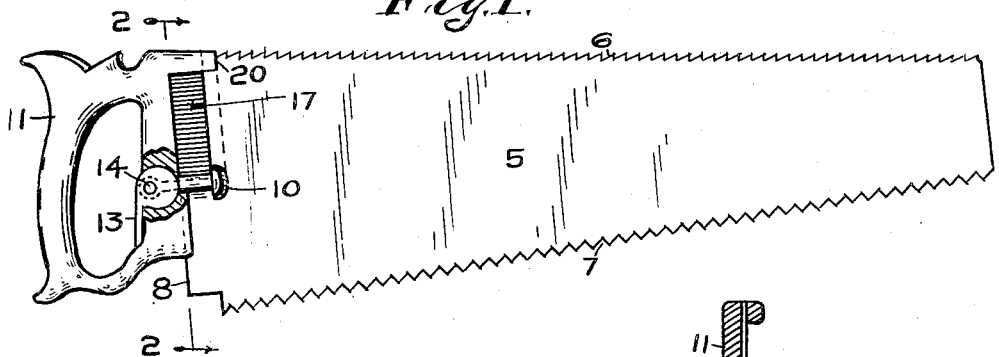
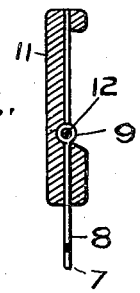
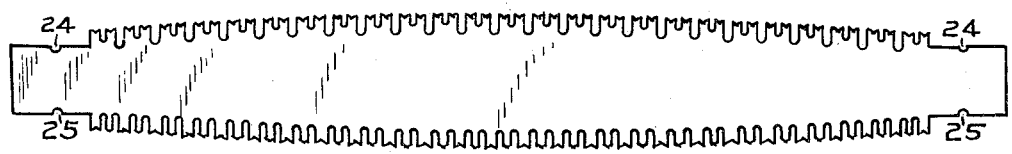
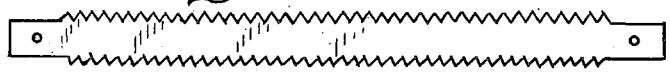
WITNESSES:
L. B. Worner
F. C. Dyner.
INVENTOR:
James M. Allison,
By
Minturn & Worner,
Attorneys.

UNITED STATES PATENT OFFICE.

JAMES M. ALLISON, OF INDIANAPOLIS, INDIANA, ASSIGNOR OF ONE-HALF TO WILLIAM C. FREED, OF INDIANAPOLIS, INDIANA.

SAW

No. 865,348.  Specification of Letters Patent.  Patented Sept. 10, 1907.

Application filed February 18, 1907. Serial No. 358,107.

*To all whom it may concern:*

Be it known that I, JAMES M. ALLISON, a citizen of the United States, residing at Indianapolis, in the county of Marion and State of Indiana, have invented certain new and useful Improvements in Saws, of which the following is a specification.

This invention relates to improvements in saws, and the object of the invention is to provide a saw-blade having cutting teeth along both of its longitudinal edges, and to provide means for the attachment and operation of a suitable reversible handle in connection therewith.

I accomplish the objects of the invention by the mechanism illustrated in the accompanying drawings in which—

Figure 1 is a view in side elevation of a handsaw having cross cut saw teeth along one edge and rip-saw teeth along the opposite edge, and a reversible handle, a portion of the latter being broken away to show the interior construction. Fig. 2 is a cross section on the line 2—2 of Fig. 1. Fig. 3 is a view in side elevation of a cross cut saw such as is used for sawing logs and heavy timbers, and is here shown with teeth of different patterns on the two longitudinal edges, and Fig. 4 is the saw blade of a buck-saw having saw teeth along both of its longitudinal edges.

Like characters of reference indicate like parts throughout the several views.

5 represents the hand-saw blade shown in Figs. 1 and 2. Its upper edge as shown in the drawing, has the rip-saw teeth 6 and its opposite edge is formed with the cross grain cutting teeth 7. The end of the blade 5 next to the handle has an extension 8 terminating at the mid line of the blade with the eye 9, and slot 10 at the inner end of the eye. 11 is the handle, of usual shape so far as the part to receive the hand of the operator is concerned and it is bolted to the blade 5 by means of the bolt 12 passing through the eye 9, and pivotally connected with the cam-lever 13. The cam on said lever 13 is pivotally attached to the handle 11 by means of the pin 14, and the cam by the closing the handle of the lever down against the inner member of the handle bears against the end of the eye 9. The bolt 12 has a head, as shown in Fig. 1, in the slot 10, and by the construction shown, the blade 5 is drawn firmly into contact with the said handle by the closing of the cam-lever 13 into the position shown in Fig. 1. When it is desired to reverse the handle the cam-lever 13 is turned up from the position shown in the drawing, which releases the bolt 12 and allows play enough for the handle to be moved longitudinally of the blade 5 out of engagement with said blade, and thereupon the handle may be turned 180 degrees so the extension 8 will then rest within the recess 17 of the handle. The outer corner of the extension 8 will preferably be made angular to make a close fit in the corresponding corner of the recess 17, and the part 20 of the handle will be channeled to receive the end of the blade. By the above construction of the handle and its attachment to the saw-blade I am able to reverse the handle so as to bring either edge of the blade into proper cutting position which is oblique to the handle proper.

The cross-cut saw shown in Fig. 3 has the two opposite notches 24 and 25 in each end for the attachment in reversed positions of the saw handle. The upper longitudinal edge of the saw-blade is here provided with cutting teeth of a different construction from those shown in the lower longitudinal edge, and while convenient for different kinds of sawing, it is obvious that teeth alike for both edges might be used to advantage in that when one set was dulled by use another set would be immediately available by turning the blade the other edge up, which would be done by reversing the handles.

The buck-saw blade shown in Fig. 4 may have different forms of teeth in its two longitudinal edges, or may have similar teeth in both edges as shown, for use successively when one set has become worn. This will be accomplished by reversing the blade in the ordinary buck-saw frame.

Having thus fully described my invention what I claim as new and wish to secure by Letters Patent of the United States, is—

1. The combination with a saw-blade having cutting teeth at its two longitudinal opposite edges, of a handle hinged at an end of the blade to permit the handle to be reversed by a lateral swinging movement, and means for moving the handle longitudinally of the blade in securing it, in a fixed position.

2. A saw-blade having cutting teeth along both of its longitudinal edges, the handle-end of said blade having an extension from near one edge to the mid line longitudinally of the blade an eye longitudinally of the blade on said mid line a bolt passing through said eye, a handle, and a cam-lever pivoted to the handle and to the said bolt, the cam of said lever being adapted to contact with the eye of the blade when closed and lock the handle to the blade.

In witness whereof, I, have hereunto set my hand and seal at Indianapolis, Indiana, this, 4th day of February, A. D. one thousand nine hundred and seven.

JAMES M. ALLISON. [L. S.]

Witnesses:
F. W. WOERNER,
L. B. WOERNER.